US009587677B2

(12) United States Patent
Roelofsen

(10) Patent No.: US 9,587,677 B2
(45) Date of Patent: Mar. 7, 2017

(54) ROLLING BEARING, AND ROTARY DEVICE WITH ROLLING BEARING

(71) Applicant: Nordischer Maschinenbau Rud. Baader GmbH + Co. KG, Lubeck (DE)

(72) Inventor: Johan H. J. Roelofsen, Wehl (NL)

(73) Assignee: Nordischer Maschinenbau Rud. Baader GmbH + Co. KG, Lubeck (DE)

( * ) Notice: Subject to any disclaimer, the term of this patent is extended or adjusted under 35 U.S.C. 154(b) by 0 days.

(21) Appl. No.: 14/427,606

(22) PCT Filed: Sep. 16, 2013

(86) PCT No.: PCT/EP2013/069147
§ 371 (c)(1),
(2) Date: Mar. 11, 2015

(87) PCT Pub. No.: WO2014/044634
PCT Pub. Date: Mar. 27, 2014

(65) Prior Publication Data
US 2015/0247531 A1   Sep. 3, 2015

(30) Foreign Application Priority Data

Sep. 19, 2012   (DE) .................. 10 2012 108 819

(51) Int. Cl.
*F16C 33/60* (2006.01)
*F16C 43/04* (2006.01)
(Continued)

(52) U.S. Cl.
CPC ............. *F16C 33/60* (2013.01); *A22C 17/00* (2013.01); *F16C 19/06* (2013.01); *F16C 19/10* (2013.01);
(Continued)

(58) Field of Classification Search
CPC .................. F16C 33/60; F16C 43/04
(Continued)

(56) References Cited

U.S. PATENT DOCUMENTS 1,071,295 A * 8/1913 Bruhl ..................... F16C 33/60
                                                    384/499
1,644,611 A * 10/1927 Rieffert .................. F16C 33/60
                                                    384/501
(Continued)

FOREIGN PATENT DOCUMENTS

CN          2382886 Y     6/2000
CN       200985951 Y    12/2007
(Continued)

OTHER PUBLICATIONS

International Search Report dated Dec. 10, 2013 from International Patent Application No. PCT/EP2013/069147 filed Sep. 16, 2013.
(Continued)

*Primary Examiner* — Phillip A Johnson
(74) *Attorney, Agent, or Firm* — Sunstone IP

(57) ABSTRACT

The present invention relates to a rolling bearing comprising a first and a second bearing body which are arranged to be rotatable relative to one another about an axis, wherein the bearing bodies comprise first and second bearing rings having running surfaces which face one another and are designed and adapted to receive a plurality of rolling bodies, wherein the rolling bodies are arranged between the running surfaces of the bearing rings, which rolling bearing is characterized in that the bearing rings are designed in multipart form by means of bearing ring segments which are detachable from one another. The invention relates further to a rotary device comprising a fixed axis and a carousel which is arranged to be rotatable about the fixed axis and is to receive items for processing in the fish and meat processing industry, which rotary device is characterized in that the
(Continued)

Figure 1:
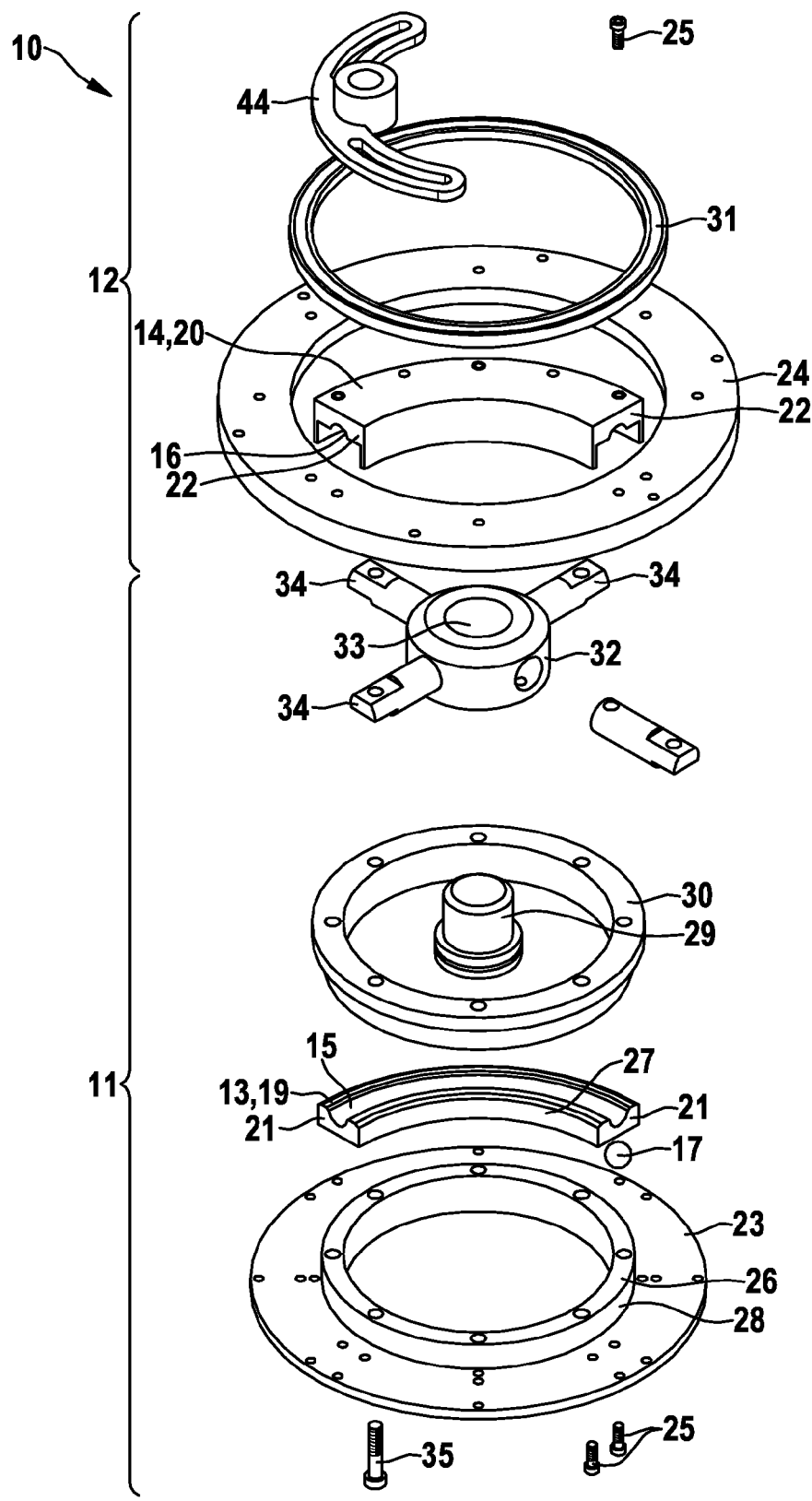

carousel is rotatably arranged on the fixed axis by means of at least one rolling bearing according to any one of claims 1 to 13.

13 Claims, 4 Drawing Sheets

(51) Int. Cl.
    *F16C 19/10*     (2006.01)
    *F16C 19/06*     (2006.01)
    *A22C 17/00*     (2006.01)
    *F16C 33/32*     (2006.01)
    *F16C 33/62*     (2006.01)
    *F16C 19/54*     (2006.01)
    *F16C 35/073*     (2006.01)

(52) U.S. Cl.
    CPC ............ *F16C 43/04* (2013.01); *F16C 19/545* (2013.01); *F16C 33/32* (2013.01); *F16C 33/62* (2013.01); *F16C 35/073* (2013.01); *F16C 2226/60* (2013.01)

(58) Field of Classification Search
    USPC ................ 384/499, 501, 502, 510, 615, 617
    See application file for complete search history.

(56) References Cited

U.S. PATENT DOCUMENTS

| | | | |
|---|---|---|---|
| 1,908,474 A | * | 5/1933 | Dewees ................. F16C 19/54 384/501 |
| 4,475,777 A | | 10/1984 | Hofmann et al. |
| 4,622,860 A | | 11/1986 | Cametti |

FOREIGN PATENT DOCUMENTS

| | | | | |
|---|---|---|---|---|
| CN | 101852246 A | | 10/2010 | |
| CN | 201884473 U | | 6/2011 | |
| DE | GB 191124655 A | * | 6/1912 | ............. F16C 33/60 |
| DE | 903154 B | | 2/1954 | |
| DE | 1073248 A | | 11/1956 | |
| DE | 959076 B | | 2/1957 | |
| DE | 202004007831 U1 | | 7/2004 | |
| DE | 102004058905 B4 | | 6/2006 | |
| DE | 102007062145 A1 | | 6/2009 | |
| DE | 102008024055 A1 | | 11/2009 | |
| DE | 102010048479 A1 | | 4/2012 | |
| DE | 102012206667 A1 | * | 10/2013 | ............. F16C 35/06 |
| EP | 1426639 A1 | | 6/2004 | |
| JP | S60208625 A | | 10/1985 | |
| JP | WO 2012157430 A1 | * | 11/2012 | ............. F16C 19/30 |
| RU | 2085772 C1 | | 12/1994 | |

OTHER PUBLICATIONS

Search Report dated Apr. 18, 2016 from Russian Patent Application No. 2015109370 filed Sep. 16, 2013.
Office Action dated Apr. 20, 2016 from Russian Patent Application No. 2015109370 filed Sep. 16, 2013.
Office Action dated Apr. 28, 2016 from Chinese Patent Application No. 201380048926.1.
International Preliminary Report on Patentability dated Mar. 24, 2015 from International Patent Application No. PCT/EP2013/069147 filed Sep. 16, 2013.

* cited by examiner

ROLLING BEARING, AND ROTARY DEVICE WITH ROLLING BEARING

The present invention relates to a rolling bearing comprising a first and a second bearing body which are arranged to be rotatable relative to one another about an axis, wherein the bearing bodies comprise first and second bearing rings having running surfaces which face one another and are designed and adapted to receive a plurality of rolling bodies, wherein the rolling bodies are arranged between the running surfaces of the bearing rings. The invention relates further to a rotary device comprising a fixed axis and a carousel which is arranged to be rotatable about the fixed axis and is to receive items for processing in the fish and meat processing industry.

Such rolling bearings are used in particular in machines and devices in the foodstuffs processing industry, for example in the processing and production of items in the fish and meat processing industry. The known rolling bearings generally consist of two bearing rings, for example in the form of axial disc-shaped bearing rings, between which there are contained rolling bodies, for example in the form of rollers, needles, balls or cones. In the known bearings, the use of lubricants is generally unavoidable.

However, the use of lubricants is problematical in the foodstuffs industry. On the one hand, the lubricants must not come into contact either directly or indirectly with the food products. On the other hand, because of hygiene requirements, it is essential that all the machine parts, including the bearings, are cleaned, which proves to be problematical on account of the bearings being provided with lubricants. A further disadvantage of the known bearings is that they are complicated to dismantle in the case of maintenance, repair and/or cleaning. Frequently, it is even necessary to dismantle large parts of the machine in order subsequently to be able to disassemble the bearings partially or completely for inspection purposes.

Accordingly, the object of the present invention is to propose a rolling bearing of the type mentioned hereinbefore which can be disassembled and cleaned with as low an outlay as possible. It is a further object to propose a rotary device having such a rolling bearing.

The object is achieved by an arrangement having the features mentioned hereinbefore in that the bearing rings are in multipart form by means of bearing ring segments which can be detached from one another. The rolling bearing according to the invention offers a number of advantages. On account of the bearing ring segments designed in multipart form, the rolling bearing is particularly simple to maintain, and worn parts, such as, for example, the bearing rings and/or the rolling bodies, can be replaced with a low outlay without having to dismantle the bearing as a whole. In particular, it is possible with the bearing according to the invention to dismantle for maintenance and/or replacement purposes only components of the rolling bearing according to the invention that are in need of repair since, because the bearing rings are formed of a plurality of bearing ring segments which can be detached from one another, the individual bearing rings are removable once the rolling bearing has been opened. The same is true for assembly. On the other hand, the rolling bearing according to the invention offers further advantages from the point of view of hygiene, since the bearing is particularly easy to clean because the individual components are easily accessible.

An expedient embodiment of the invention is characterised in that the bearing bodies each comprise a first ring element and a second ring element, wherein the first bearing ring segments are detachably arranged on the first ring element and the second bearing ring segments are detachably arranged on the second ring element over the entire periphery by means of connection means. The ring elements serve as support elements on which the bearing ring segments are fastened and joined to form the respective bearing rings. At the same time, the ring elements additionally serve as a mounting base on which there can be arranged further components which are to be mounted to be rotatable with respect to the axis.

A preferred further development of the invention is characterised in that the first ring element and/or the second ring element are/is at least substantially disc-shaped. The ring element accordingly provides the mechanical stability that is required to fix the bearing ring segments securely and at the same time is advantageous on account of a small installation height.

According to a further preferred embodiment of the invention, the first bearing body comprises an interior ring element, wherein the inner peripheral surfaces of the first bearing ring segments abut the outer peripheral surface of the interior ring element in a positive locking manner. On account of the positive-locking abutment, the bearing ring segments are particularly simple to position during installation, because the position is specified, or defined, by the interior ring element at least in the radial direction.

A further expedient embodiment of the invention is characterised in that the first bearing body is connected to a hydraulic coupling for fastening the first bearing body to the axis. This offers the advantage that the first bearing body can be detached from the axis, or, where appropriate, arranged thereon, in a particularly simple manner, if required, by means of the hydraulic coupling.

According to a further preferred embodiment, the interior ring element is arranged on the first ring element. In other words, the interior ring element forms an interior cylinder at one end of which the first ring element is arranged, preferably by firmly bonding.

A further expedient embodiment of the invention is characterised in that the first bearing body comprises a further interior ring element, wherein the further interior ring element is detachably arranged on the interior ring element. The further interior ring element accordingly constitutes a connection element by means of which further components of the first bearing body are connected to the bottom first bearing body part consisting of the first ring element and the interior ring element. Furthermore, by means of the detachable connection between the further interior ring element and the interior ring element, the first bottom bearing body part can be moved in the axial direction relative to the further interior ring element, for example in order to lower the bottom bearing body part for maintenance, repair and/or cleaning purposes.

According to a further preferred embodiment of the invention, a mounting ring element having an axial recess for receiving the hydraulic coupling is arranged on the further interior ring element, wherein the mounting ring element is connected to the further interior ring element by means of at least two transverse webs. This offers the advantage that spaces remain between the transverse webs through which supply lines, for example hoses for water or cleaning liquids as well as electrical and/or optical lines for control and power supply purposes, can be guided.

A further advantageous embodiment of the invention is characterised in that the first bearing body is adapted and designed to be displaceable in the axial direction relative to the second bearing body. Accordingly, the rolling bearing according to the invention can be "opened" for maintenance, repair, inspection and cleaning purposes and then "closed" again particularly easily without dismantling the entire rolling bearing, or the apparatus in which the rolling bearing is fitted.

According to an advantageous embodiment of the invention, the first bearing ring comprises a first outer bearing ring and a separate first inner bearing ring, so that the first bearing ring not only comprises a plurality of bearing ring segments in the peripheral direction but is also divided into the first outer bearing ring and the first inner bearing ring. The first outer bearing ring and the first inner bearing ring in turn each comprise a plurality of bearing ring segments.

According to a further preferred embodiment of the invention, the second bearing ring comprises a second outer bearing ring and a separate second inner bearing ring. In other words, the second bearing ring not only comprises a plurality of bearing ring segments in the peripheral direction but is also divided into the second outer bearing ring and the second inner bearing ring. Both the second outer bearing ring and the second inner bearing ring in turn each comprise a plurality of bearing ring segments.

According to a particularly preferred embodiment of the invention, the rolling bodies and/or the bearing rings are made of plastics material. This offers the advantage, in particular at low speeds of less than 30 revolutions per minute, that lubrication of the rolling bearing is not required, which is otherwise problematical for a variety of reasons in the foodstuffs industry sector for reasons of hygiene. Furthermore, unlike metal parts, plastics parts are not susceptible to rusting in the event of water ingress. It is therefore possible, for example, for water or other liquids which are obtained during the processing of items in the meat and fish processing industry in an apparatus provided with the rolling bearing according to the invention to be used at the same time as a cooling or lubricating liquid in the rolling bearing according to the invention. It is also possible to add antibacterial or disinfecting additives to the liquids in order to suppress the possible growth of bacteria in the rolling bearing.

According to a further advantageous embodiment of the invention, the rolling bodies are balls. Because of the low rolling friction of the balls, the rolling bearing according to the invention thus runs particularly smoothly.

The object is further achieved by a rotary device having the features mentioned hereinbefore in that the carousel is rotatably arranged on the fixed axis by means of at least one rolling bearing according to any one of claims 1 to 13. As has already been described hereinbefore, the rolling bearing according to the invention is particularly easy to maintain or repair and, in addition, is optimally usable for use in an environment which makes high demands in terms of hygiene. The rolling bearing according to the invention is therefore suitable in particular for use in rotary devices. Liquids which are obtained during the processing of items or products which are to be produced in the meat and fish processing industry are frequently contaminated with bacteria. Because of the possibility described hereinbefore of being able to clean the rolling bearing according to the invention particularly easily, the rolling bearing according to the invention is optimally configured to meet the high demands in the foodstuffs sector in terms of hygiene.

Figure 2:
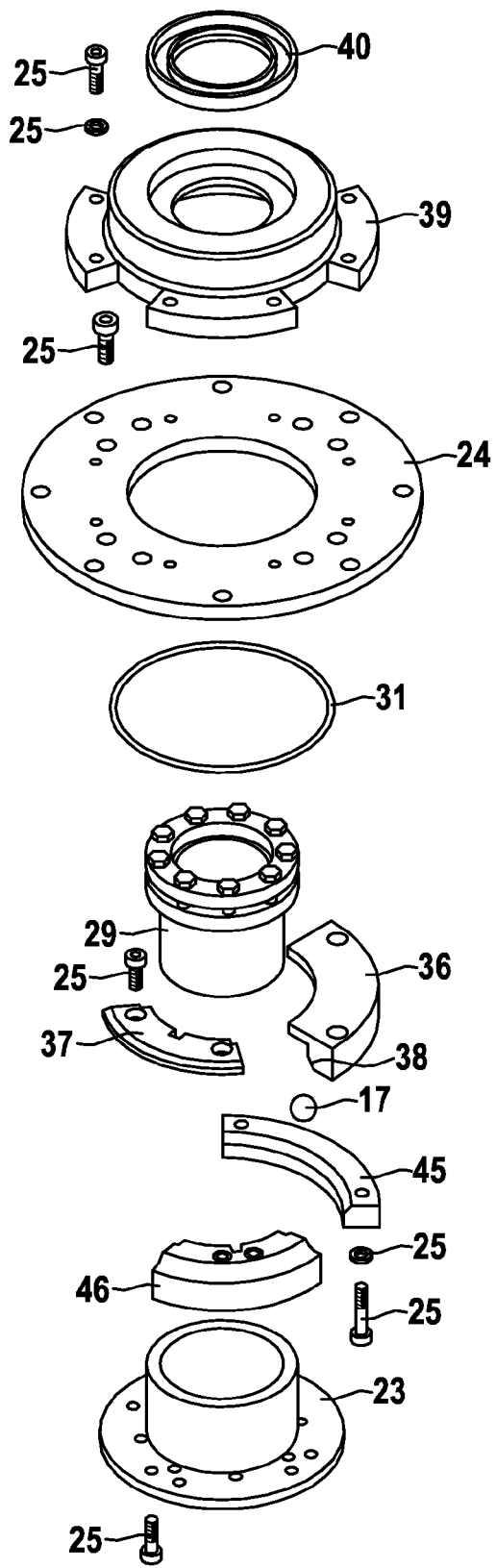
Figure 3:
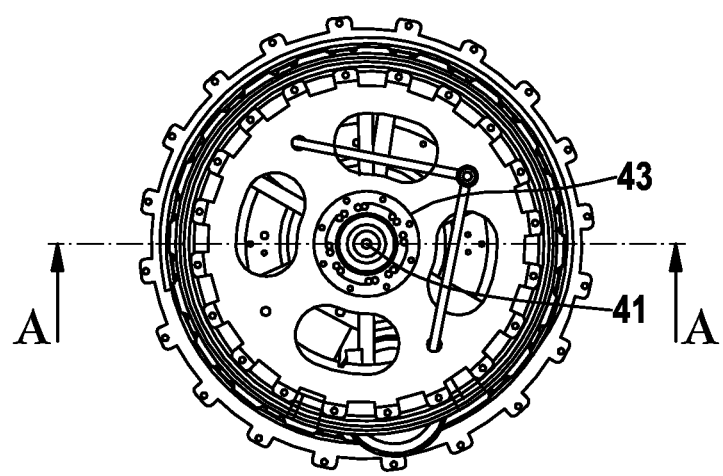
Figure 3:
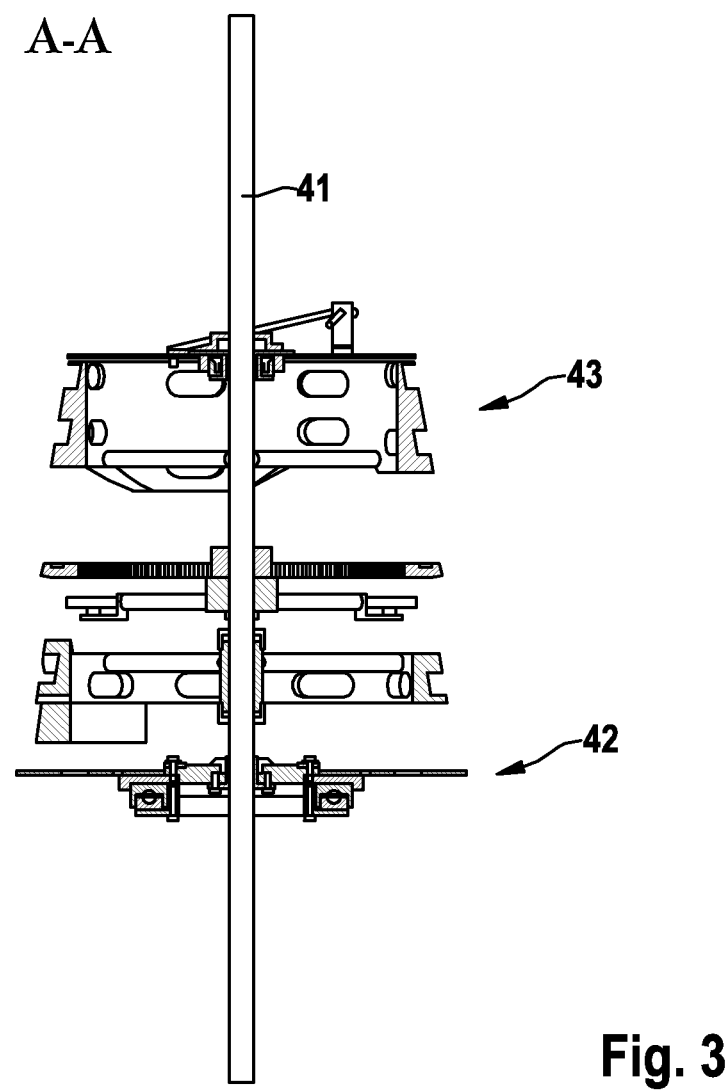
Figure 4:
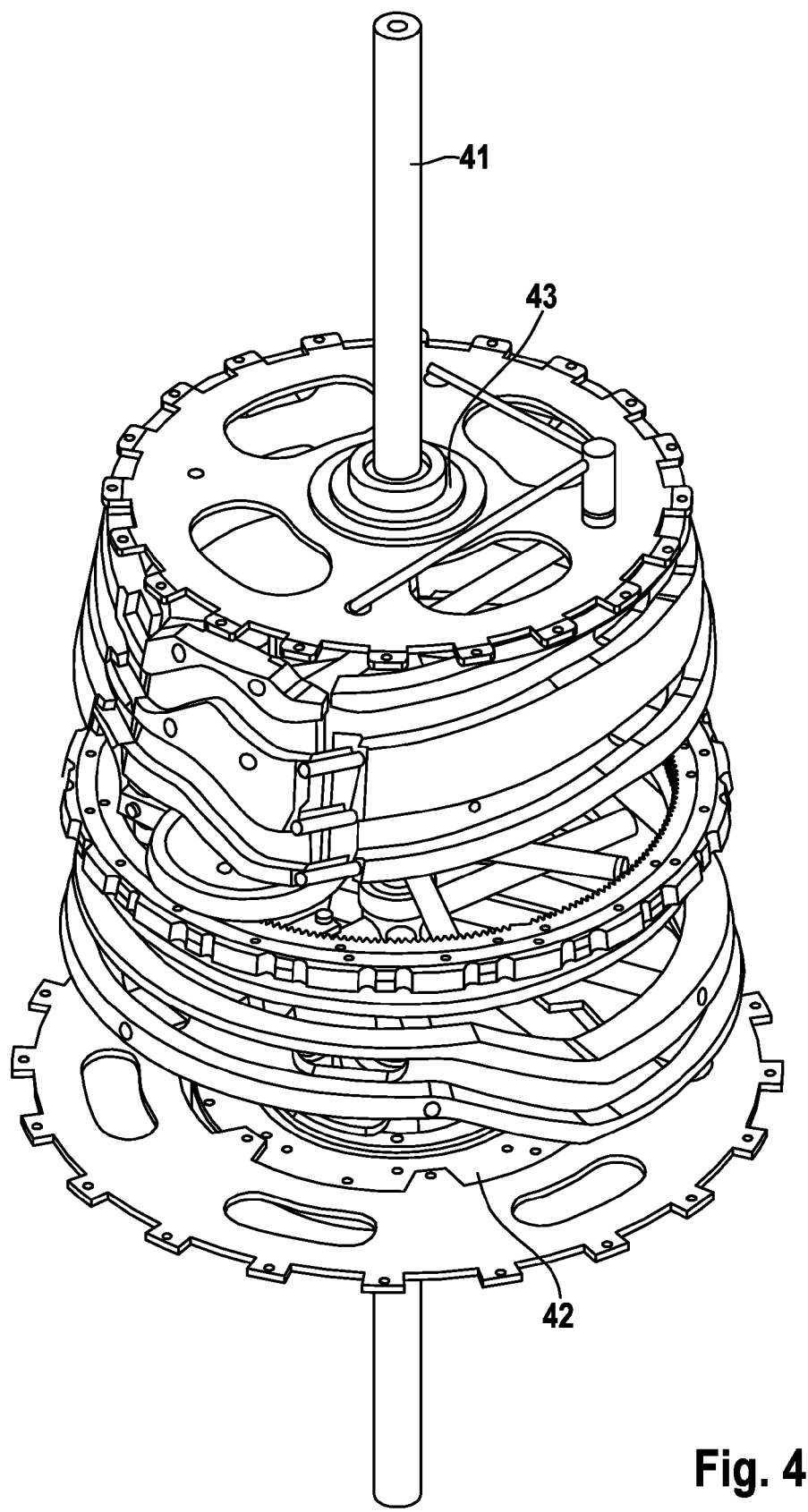

Further preferred and/or expedient features and embodiments of the invention will become apparent from the dependent claims and the description. Particularly preferred embodiments will be explained in greater detail with reference to the accompanying drawing, in which:

FIG. 1 shows an exploded view of a rolling bearing 10 according to the invention according to a first exemplary embodiment of the present invention, FIG. 2 shows an exploded view of a further exemplary embodiment of the rolling bearing 10 according to the invention, FIG. 3 shows a top view and a sectional view along the cutting line A-A of part of an exemplary rotary device, and FIG. 4 shows a perspective view of the part of the rotary device shown in FIG. 3.

FIG. 1 shows an exploded view of a rolling bearing 10 according to the invention according to a first exemplary embodiment of the present invention. The rolling bearing 10 comprises a first bearing body 11 and a second bearing body 12. The first bearing body 11 and the second bearing body 12 are arranged to be rotatable relative to one another about an axis 41—not shown in FIG. 1. The first bearing body 11 comprises a first bearing ring 13, and the second bearing body 12 comprises a second bearing ring 14. The first and second bearing rings 13, 14 have first running surfaces 15 and second running surfaces 16, which are designed and adapted to receive a plurality of rolling bodies 17. The running surfaces 15, 16 are preferably in such a form, corresponding to the geometry of the rolling bodies 17, that the rolling bodies 17 arranged between the running surfaces 15, 16 are guided by the running surfaces 15, 16. Particularly preferably, the running surfaces 15, 16 are in grooved form.

As is shown in FIG. 1, the first and second bearing rings 13, 14 are preferably designed in multipart form, that is to say the bearing rings 13, 14 comprise a plurality of bearing ring segments 19, 20, namely the first bearing ring 13 comprises the first bearing ring segments 19 and the second bearing ring 14 comprises the second bearing ring segments 20, of which in each case only one is shown in FIG. 1 for the purpose of better clarity. Preferably, each of the bearing rings 13, 14 comprises at least two of the bearing ring segments 19, 20. Particularly preferably, each of the bearing rings 13, 14 comprises four bearing ring segments 19, 20. In principle, any number of bearing ring segments 19, 20 greater than two is suitable. If n denotes the number of first and second bearing ring segments 19, 20, then the angle at the centre of each bearing ring segment 19, 20 is determined according to the relationship $\alpha=360°/n$. Consequently, the bearing ring segments 19, 20 together always form a full circle, so that a complete running surface 15, 16 covering the entire periphery is obtained. Preferably, the bearing ring segments 19, 20 are designed such that they are arranged with their respective end faces 21, 22 abutting the respective other end face 21, 22 in a positive locking manner. The rolling bearing 10 shown in FIG. 1 is designed and adapted as an axial bearing 42, that is to say preferably for absorbing forces acting in the direction of the axis 41.

Preferably, the first bearing body 11 comprises a first ring element 23 and the second bearing body 12 comprises a second ring element 24. The first and second bearing ring segments 19, 20 are arranged on the ring elements 23, 24, that is to say the first bearing ring segments 19 are arranged on the first ring element 23 and the second bearing ring segments 20 are arranged on the second ring element 24, over the entire periphery. Furthermore, the bearing ring segments 19, 20 are detachably arranged on the respective ring elements 23, 24 by means of connection means 25. Screws are preferably used as the connection means 25. To that end, bearing ring segments 19, 20 have on their sides remote from the running surfaces 15, 16 corresponding threaded bores for receiving the connection means 25. The ring elements 23, 24 likewise have bores positioned correspondingly thereto, through which the screws are guided and the ring elements 23, 24 are connected to the bearing ring segments 19, 20. Alternatively, the connection between the bearing ring segments 19, 20 and the ring elements 23, 24 is in the form of a positive locking and/or non-positive locking connection, for example in the form of a clamp and/or snap-fit connection.

Further preferably, the first and/or the second ring elements 23, 24 are disc-shaped, for example in the form of a metal or plastics disc element. Particularly preferably, the first bearing body 11 comprises an interior ring element 26. The interior ring element 26 is designed such that the inner peripheral surfaces 27 of the first bearing ring segments 19 abut the outer peripheral surface 28 of the interior ring element 26. In other words, the outside diameter of the interior ring element 26 corresponds to the inside diameter of the bearing ring segments 19 which are joined together to form a full circle.

Advantageously, the first bearing body 11 comprises a hydraulic coupling 29 by means of which the first bearing body 11 can be connected to the axis 41—not shown in FIG. 1. The hydraulic coupling 29 is preferably in the form of a hydraulic clamping piece. In this manner, the clamping piece can be widened hydraulically and thus pushed over the axis 41 for mounting. The connection between the clamping piece and the axis 41 is then formed by the textural stress of the material, for example steel, of the clamping piece.

Particularly preferably, the interior ring element 26 is arranged on the first ring element 23. In other words, the interior ring element 26 forms a cylindrical prolongation of the first ring element 23 in the axial direction. Further preferably, the interior ring element 26 is connected to the first ring element 23 by firmly bonding.

Advantageously, the first bearing body 11 comprises a further interior ring element 30. The further interior ring element 30 is detachably arranged on the first interior ring element 26, for example by screwing. The outside diameter of the further interior ring element 30 is smaller than the inside diameter of the second ring element 24, so that a gap is formed between the further interior ring element 30 and the second ring element 24, which gap is provided with a sealing ring 31, for example.

Preferably, a mounting ring element 32 having an axial recess 33 for receiving the hydraulic coupling 29 is arranged on the further interior ring element 30. The mounting ring element 32 and the hydraulic coupling 29 are preferably connected together in a positive locking manner. The mounting ring element 32 is connected to the further interior ring element 30 by means of at least two transverse webs 34, particularly preferably by means of three or more transverse webs 34. The entire first bearing body 11 is fastened to the axis 41 via the mounting ring element 32, the transverse webs 34 and the further interior ring element 30.

Particularly preferably, the first bearing body 11 is designed to be displaceable in the axial direction relative to the second bearing body 12. To that end, axially extending threaded rods, for example—not shown in the drawing—are arranged on the further interior ring element 30, which threaded rods are guided through bores of the interior ring element 26 and/or of the first ring element 23. Nuts are arranged on the free ends of the threaded rods, by means of which nuts the first ring element 23 with the first bearing ring segments 19 can be lowered, that is to say moved away from the second bearing body 12, and optionally raised again, that is to say moved towards the second bearing body 12. Instead of the threaded rods, screws 35 are used as an alternative, which screws are guided through the bores of the first ring element 23 and/or of the interior ring element 26 and end in corresponding threaded bores in the further interior ring element 30. The screws 35 are preferably sufficiently long that the first ring element 23 with the first bearing ring segments 19 can be lowered far enough by means of the screws 35 to gain free access to the bearing ring segments 19 and the rolling bodies 17.

Further parts 44 are optionally arranged on the second ring element 24, so that the ring element 24 serves as the supporting plate therefor.

FIG. 2 shows an exploded view of a further rolling bearing 10 according to the invention. The rolling bearing 10 shown in FIG. 2 corresponds essentially to the rolling bearing 10 shown in FIG. 1, so that reference is made to all the remarks made hereinbefore and only the differences are discussed in the following. An essential difference with respect to the rolling bearing 10 shown in FIG. 1 is that the second bearing ring 14 comprises a second outer bearing ring 36 and a separate second inner bearing ring 37. Both the second outer bearing ring 36 and the second inner bearing ring 37 are composed of a plurality of bearing ring segments—as has already been described hereinbefore in connection with FIG. 1.

Particularly preferably, the first bearing ring 13 further comprises a first outer bearing ring 45 and a separate first inner bearing ring 46. The first outer bearing ring 45 and the separate first inner bearing ring 46 are each composed of a plurality of bearing ring segments. Advantageously, the first inner bearing ring 46 and the second inner bearing ring 37 are designed such that the running surface formed thereby encloses the rolling bodies 17 over more than 180°. The rolling bodies 17 are thus reliably prevented from falling out when the rolling bearing 10 is opened. In other words, the first outer bearing ring 45 and the second outer bearing ring 36 can be dismantled, while the rolling bodies 17 continue to be held on the running surface by the first inner bearing ring 46 and the second inner bearing ring 37. In order to release the rolling bodies 17 from their enclosure, the first and second inner bearing rings 46, 37—which are screwed together, for example—are to be detached from one another and moved apart at least sufficiently that the rolling bodies 17 are released.

The rolling bearing 10 according to the invention shown in FIG. 2 preferably does not comprise a further interior ring element 30 or a mounting ring element 32, which would be arranged thereon. Instead, the hydraulic coupling 29 is arranged directly in the interior ring element 26 in a positive locking manner. Further preferably, the second bearing body 12 comprises a covering cap 39 as well as a shaft seal 40 which surrounds the axis 41.

Preferably, the rolling bodies 17 and/or the bearing rings 13, 14, 36, 37, 45, 46 shown in FIGS. 1 and 2 are made of plastics material. Further preferably, the rolling bodies 17 are in the form of balls. Alternatively, the rolling bodies 17 are in the form of cylindrical or tapered rollers.

FIG. 3 shows a top view and a sectional view along the cutting line A-A of part of an exemplary rotary device in which the rolling bearing 10 according to the invention is fitted. FIG. 3 shows inter alia the fixed axis 41 and on the one hand the rolling bearing 10 according to the invention in the form of an axial bearing 42 shown in FIG. 1 and described hereinbefore, as well as the rolling bearing 10 according to the invention in the form of a radial bearing 43 shown in FIG. 2 and described hereinbefore.

FIG. 4 again shows the part of the rotary device shown in FIG. 3 in a perspective view. Because the further components of the rotary device shown in FIGS. 3 and 4 are sufficiently well known from the prior art, a more detailed description of these components will not be given.

The rolling bearing 10 according to the invention shown in FIGS. 1 to 4 is preferably lubricated by means of water as the anti-friction agent or lubricant. Preferably, the rolling bearing 10 comprises further devices—not shown in the drawing—which are designed and adapted to introduce water between the rolling bodies 17 and the first and second running surfaces 15, 16. Particularly preferably, the rolling bearing 10 further comprises discharge devices by means of which the water that has been introduced can be discharged from the inner bearing region, in particular from the first and second running surfaces 15, 16. Such discharge devices comprise, for example, a plurality of through-bores which are arranged in the first and second bearing rings 13, 14. By means of those through-bores, water that has been introduced is able to flow away. Particularly preferably, the water is provided with antibacterial additives which inhibit or suppress the growth of bacteria and thus effectively prevent the rolling bearing from becoming contaminated, as would otherwise be possible.

The invention claimed is:

1. A rolling bearing, comprising
a first bearing body and a second bearing body which are arranged to be rotatable relative to one another about an axis,
wherein the first bearing body comprises a first bearing ring and the second bearing body comprises a second bearing ring, wherein the first bearing ring and the second bearing ring have running surfaces which face one another and are designed and adapted to receive a plurality of rolling bodies,
wherein the rolling bodies are arranged between the running surfaces of the bearing rings,
characterised in that
the first bearing ring and the second bearing ring are designed in multipart form by means of first bearing ring segments and second bearing ring segments which are detachable from one another, wherein the first bearing body and the second bearing body each comprise a first ring element and a second ring element, wherein the first bearing ring segments are detachably arranged on the first ring element and the second bearing ring segments are detachably arranged on the second ring element over the entire periphery by means of connection means.

2. The rolling bearing according to claim 1, characterised in that the first ring element and/or the second ring element are/is at least substantially disc-shaped.

3. The rolling bearing according to claim 1, characterised in that the first bearing body comprises an interior ring element, wherein the inner peripheral surfaces of the first bearing ring segments abut the outer peripheral surface of the interior ring element in a positive locking manner.

4. The rolling bearing according to claim 3, characterised in that the interior ring element is arranged on the first ring element.

5. The rolling bearing according to claim 4, characterised in that the first bearing body comprises a further interior ring element, wherein the further interior ring element is detachably arranged on the interior ring element.

6. The rolling bearing according to claim 5, characterised in that a mounting ring element having an axial recess for receiving the hydraulic coupling is arranged on the further interior ring element, wherein the mounting ring element is connected to the further interior ring element by means of at least two transverse webs.

7. The rolling bearing according to claim 1, characterised in that the first bearing body is connected to a hydraulic coupling for fastening the first bearing body to the axis.

8. The rolling bearing according to claim 1, characterised in that the first bearing body is adapted and designed to be displaceable in the axial direction relative to the second bearing body.

9. The rolling bearing according to claim 1, characterised in that the first bearing ring comprises a first outer bearing ring and a separate first inner bearing ring.

10. The rolling bearing according to claim 1, characterised in that the second bearing ring comprises a second outer bearing ring and a separate second inner bearing ring.

11. The rolling bearing according to claim 1, characterised in that the rolling bodies and/or the bearing rings are made of plastic material.

12. The rolling bearing according to claim 1, characterised in that the rolling bodies are balls.

13. A rotary device, comprising a fixed axis and a carousel which is arranged to be rotatable about the fixed axis and is to receive items for processing in the fish and meat processing industry, characterised in that the carousel is rotatably arranged on the fixed axis by means of at least one rolling bearing according to claim 1.

* * * * *